United States Patent [19]

Joubert

[11] Patent Number: 4,649,030
[45] Date of Patent: Mar. 10, 1987

[54] PROCESS FOR THE PURIFICATION OF URANIFEROUS AND/OR MOLYBENDIFEROUS AMINO ORGANIC SOLUTIONS WHICH CONTAIN ZIRCONIUM AND/OR HAFNIUM AMONG OTHER IMPURITIES

[75] Inventor: Philippe Joubert, Lyons, France

[73] Assignee: Uranium Pechiney, France

[21] Appl. No.: 616,537

[22] Filed: Jun. 1, 1984

[30] Foreign Application Priority Data

Jun. 7, 1983 [FR] France .................................. 83 09934

[51] Int. Cl.⁴ ...................... C01G 43/00; C01G 39/00; C01G 25/00; C01G 27/00
[52] U.S. Cl. .......................................... 423/9; 423/54; 423/70
[58] Field of Search ................ 423/9, 54, 70

[56] References Cited

U.S. PATENT DOCUMENTS

| | | | |
|---|---|---|---|
| 3,115,388 | 12/1963 | Goren | 423/9 |
| 3,156,524 | 11/1964 | Drobnick et al. | 423/9 |
| 3,223,476 | 12/1965 | Hart | 423/9 |
| 3,341,305 | 9/1967 | Kreevoy et al. | 423/9 |
| 4,188,361 | 2/1980 | Rowden | 423/9 |
| 4,363,788 | 12/1982 | Floreancig et al. | 423/9 |
| 4,381,286 | 4/1983 | Floreancig | 423/9 |
| 4,381,287 | 4/1983 | MacDonald et al. | 423/9 |
| 4,406,864 | 9/1983 | Weir et al. | 423/9 |

FOREIGN PATENT DOCUMENTS 8102429  7/1982  Brazil.

OTHER PUBLICATIONS

Sawant et al., "Talanta", vol. 27, (#2), pp. 209–211, Pergamon Press (Feb. 1980).
Coleman et al., *Industrial & Engineering Chem.*, 50 (#12) 1756–1762 (Dec. 1958).

Primary Examiner—Edward A. Miller
Attorney, Agent, or Firm—McDougall, Hersh & Scott

[57] ABSTRACT

A process for the purification by selective separation of uranium and/or molybdenum from zirconium and/or hafnium among other impurities contained in an amino organic phase by bringing them together with an aqueous sulphuric re-extraction solution, characterized in that, with a view to increasing the separation factor of the zirconium and/or hafnium on the one hand and the uranium and/or molybdenum on the other hand, the aqueous sulphuric re-extraction solution contains at least one alkali or equivalent sulphate.

15 Claims, 1 Drawing Figure

PROCESS FOR THE PURIFICATION OF URANIFEROUS AND/OR MOLYBENDIFEROUS AMINO ORGANIC SOLUTIONS WHICH CONTAIN ZIRCONIUM AND/OR HAFNIUM AMONG OTHER IMPURITIES

The present invention relates to a process for the purification by selective separation of zirconium and/or hafnium which is contained in an amino organic phase which also contains uranium and/or molybdenum.

For some-time now those skilled in the art have encountered major difficulties when it was found necessary to separate uranium, a much sought after element, from the other metallic elements, such as molybdenum, vanadium, zirconium and hafnium among others which are present in the attack liquors.

In an attempt to overcome this problem, the relevant literature has already proposed processes for separating uranium from the impurities which accompany it.

A first type of process for separating uranium from its impurities was described in "The Extractive Metallurgy of Uranium" by Robert Merrit (pages 196–201). This process consists of simultaneously extracting uranium and the molybdenum impurity from the aqueous liquor from the attacking acid of a uraniferous ore using organic solvents, such as amino solvents, which are conventionally known for completely extracting uranium from the said liquors, then separating these two elements while freeing the uranium contained in the organic phase by, for example, contacting this organic solvent which is charged with uranium and molybdenum with an aqueous solution of alkaline chlorides or ammonium which re-extracts the uranium in the form of a uranyl salt, while the molybdenum remains in the organic solvent.

But while this process enables molybdenum to be separated from uranium, this is not the case when the amino solvent contains zirconium and/or hafnium in addition to uranium and molybdenum. In this case, the zirconium and/or hafnium are jointly extracted with uranium.

Faced with this new necessity of separating uranium from zirconium and/or hafnium which are simultaneously present in amino extraction solutions, those skilled in the art proposed processes for the more selective separation of these metallic elements which are to be found in the relevant literature.

One of these processes, described in U.S. Pat. No. 4,381,287, consists of treating an amino organic solution containing zirconium and uranium, with a view to the selective separation thereof, by means of a process consisting of two stages, the first stage consisting of re-extracting zirconium and some of the uranium using an aqueous hydrochloric solution, that is composed of NaCl and HCl in a molar ratio of from 13/1 to 6/1, and the second stage consisting of washing the aqueous re-extracting phase (from the first stage) using an amino organic phase, which is free of metallic elements and has been previously chlorinated by the same acid solution which is rich in chloride ions, but free of the metallic elements U and Zr and/or, Hf, which are to be separated.

In common with the process which is described in "Meritt", a process of this type also has a first stage but is distinguishable from the said process by the stage in which the aqueous stage is washed and which encourages the re-extraction of uranium, that is the selective separation of uranium and zirconium. However, the resulting organic phase contains almost all of the uranium and a fraction of the zirconium which could not be selectively re-extracted. Consequently, this process cannot guarantee the production of a uraniferous organic phase which is sufficiently depleted of zirconium, except when a series of extracting and washing stages are used, this being incompatible with financially profitable industrial concerns as there are in the field of uraniferous ore processing.

Another process which is described in the Brazilian Pat. No. 8102429, consists of treating the amino organic solvent containing uranium, molybdenum, zirconium and/or hafnium resulting from the extraction stage of these elements which are contained in a sulphuric lixiviate using a sulphuric solution, having a pH of from 0.5 to 2, and containing hydrogen peroxide at a suitable concentration for the chelation of zirconium and other impurities, such as iron, aluminium and manganese.

But this process suffers from disadvantages which are major enough to make it financially unviable in industrial processes of selective separation.

One of the disadvantages is the fact that the application of the said treatment produces a uraniferous concentrate which has been insufficiently purified of zirconium, as it still contains at least 2800 ppm of this impurity in relation to uranium, whereas international standards recommend a zirconium content of no more than 100 ppm in relation to uranium (ASTM C. Standard 976-81).

A further disadvantage is that it is incumbent to use hydrogen peroxide in the above-mentioned process, a reagent which has a tendency to decompose easily under the effects of heat, thereby making it difficult to use in hot countries, such as certain African, Latin American and tropical countries among others.

Yet another disadvantage is the fact that the industrial sites for the production of uranium are often remote or isolated from centers of hydrogen peroxide production, and this means that this reagent has to be transported in highly elaborate conditioning packing to avoid the decomposition thereof in the course of time, then the empty packaging has to be recycled or even that a plant for manufacturing the said peroxide has to be constructed on the site itself.

Faced with the processing of urano-molybdeno-zirconiferous ores and in particular with the purification of the liquors produced by the attack of these ores, the Applicant has found a process for the selective separation of uranium and/or molybdenum, zirconium and/or hafnium using a substantially sulphuric liquor.

The process according to the present invention for purifying, by selective separation uranium and/or molybdenum from the zirconium and/or hafnium contained in an amino organic phase by bringing them together with an aqueous sulphuric re-extraction solution is characterised in that the aqueous sulphuric re-extraction solution contains at least one alkali or equivalent sulphate in order to increase the separation factor of the zirconium and/or hafnium on the one hand and the uranium and/or molybdenum on the other hand.

The term separation factor is used by the Applicant to define the ratio of the coefficients of partition of the uranium and/or molybdenum and the zirconium and/or hafnium, the coefficient of partition being defined by the ratio of the concentrations of each of the elements between the organic phase and the aqueous phase.

Thus, the separation factor "f" is represented by the formulation:

$$f = \frac{\frac{/U \text{ and/or Mo}/ \text{ organic phase}}{/U \text{ and/or Mo}/ \text{ aqueous phase}}}{\frac{/Zr \text{ and/or Hf}/ \text{ organic phase}}{/Zr \text{ and/or Hf}/ \text{ aqueous phase}}}$$

The aqueous sulphuric re-extraction solution, which, as specified above, has to contain at least one alkali or equivalent sulphate, is such that the molar ratio of the alkali sulphate and the $H^+$ concentration should be at least equal to 10 generally from 15 to 5000 and preferably from 100 to 500.

In conjunction with the above-mentioned molar ratio for the aqueous sulphuric re-extraction solution, the pH of the re-extraction medium that is the pH which is effective at the moment when the re-extraction of zirconium takes place by bringing together the organic phase to be treated and the re-extracting aqueous phase, should be from 1.5 to 3 and preferably from 2 to 3.

The alkali or equivalent sulphate which is used in the framework of the process according to the present invention is preferably chosen from the group consisting of sodium and ammonium. The other alkali or equivalent metals, such as potassium, lithium, rubidium, cesium and thallium produce equivalent results; but in practice, industry does not make use of these metals, although the sulphates thereof are within the scope of the invention, for essentially economic reasons.

The alkali or equivalent sulphate may be used on its own, such as $Na_2SO_4$ or $(NH_4)_2SO_4$, or in admixture, such as $Na_2SO_4$ and $(NH_4)_2SO_4$ in a variable proportion.

According to a variant of the present invention, it may be effective in certain specific cases to introduce hydrogen peroxide into the aqueous sulphuric re-extraction solution according to the present invention, that is containing at least one alkali or equivalent sulphate. In this instance, the quantity of hydrogen peroxide which is introduced is determined by the molar ratio $H_2O_2/(Zr+Hf)$ which must be at least equal to 1 and which is preferably selected from the range of from 1.5 to 3.

According to the present process, the amino organic phase containing uranium and/or molybdenum, zirconium and/or hafnium may be contacted with the aqueous sulphuric re-extraction solution containing at least one alkali sulphate, using one or more co-current or counter-current mixer-decanters with a view to selectively re-extracting the zirconium and/or hafnium.

When the zirconium and/or hafnium re-extraction is carried out in co-current, this extraction may be carried out in a suitable zone having one or more mixers positioned in cascade, followed by a decanter. When the suitable zone has only one mixer, the pH of the treatment medium is chosen from the above-mentioned range of from 1.5 to 3, whereas, when the suitable zone has more than one mixer, that is at least two, the pH of each mixer, while being within the above-mentioned range, is different from each of the other mixers and is gradually increased, each mixer being adjusted using a suitable agent, that is acidic or alkaline, depending on the state of the medium.

When the zirconium and/or hafnium re-extraction is carried out in counter-current, it may be carried out in a zone having at least two groups of mixer and decanter, mounted in series, each group having its own operating pH, selected within the above mentioned range, but different from each other, the pH of each group being adjusted using a suitable agent, acidic or alkaline depending on the state of the medium.

The treatment according to the present invention is carried out at a temperature of from 15° C. to 50° C., but the use of a temperature outside this range is also possible.

In the one or more mixers, the duration of contact of the amino organic phase and the aqueous re-extraction solution according to the present invention is at least one minute and preferably in the range of from 10 to 30 minutes.

In practice, the process according to the present invention may be incorporated into the treatment line for recovering uranium and/or molybdenum resulting from the processes acid attack, comprising the following stages:

(a) extraction of uranium and/or molybdenum and some of the impurities which are contained, such as zirconium and/or hafnium in solution in a sulphuric liquor resulting from the acid attack of a mineral, using an amino organic phase, generally consisting of a mixture of secondary and/or tertiary amines in solution in a water-immiscible organic agent, such as kerosene.

(b) recovery of the amino organic phase, charged with uranium and/or molybdenum and the above-mentioned impurities by the aqueous sulphuric re-extraction solution containing at least one alkali and equivalent sulphate.

(c) treatment of the aqueous sulphuric re-extraction solution containing zirconium and/or hafnium according to a known process to extract the zirconium and/or hafnium.

(d) recovery of the amino organic phase which has been decontaminated of zirconium and/or hafnium using an aqueous re-extraction solution of uranium on its own or a mixture of uranium and molybdenum according to known processes, and in this second case, recycling the organic phase to stage (a).

(e) treatment with the aqueous re-extraction solution of uranium by a known process with a view to the recovery thereof in the form of a commercial concentrate.

(f) recovery of the amino organic phase which has been decontaminated of zirconium and/or hafnium using an aqueous re-extraction liquor, according to a known process, to isolate the molybdenum when it is not being re-extracted in stage (d) and recycle the organic phase to stage (a).

(g) treatment of the aqueous re-extraction solution of molybdenum by a known process with a view to the recovery thereof in the form of a concentrate or even treatment of the deuranized aqueous solution resulting from stage (d).

BRIEF DESCRIPTION OF THE DRAWING

The invention will now be better understood with reference to the FIGURE, a diagram of the process which illustrates an application for the selective separation of zirconium and/or hafnium and molybdenum and the recovery of the uranium in the form of a commercial concentrate, using an acidic liquor resulting from the attack of a uraniferous ore and the impurities thereof.

According to the FIGURE, the regenerated amino organic phase $L_1$ is simultaneously introduced into the extraction zone (A) in counter-current with the uraniferous sulphuric liquor $L_2$ resulting from the acid attack of the ore.

Figure 1:
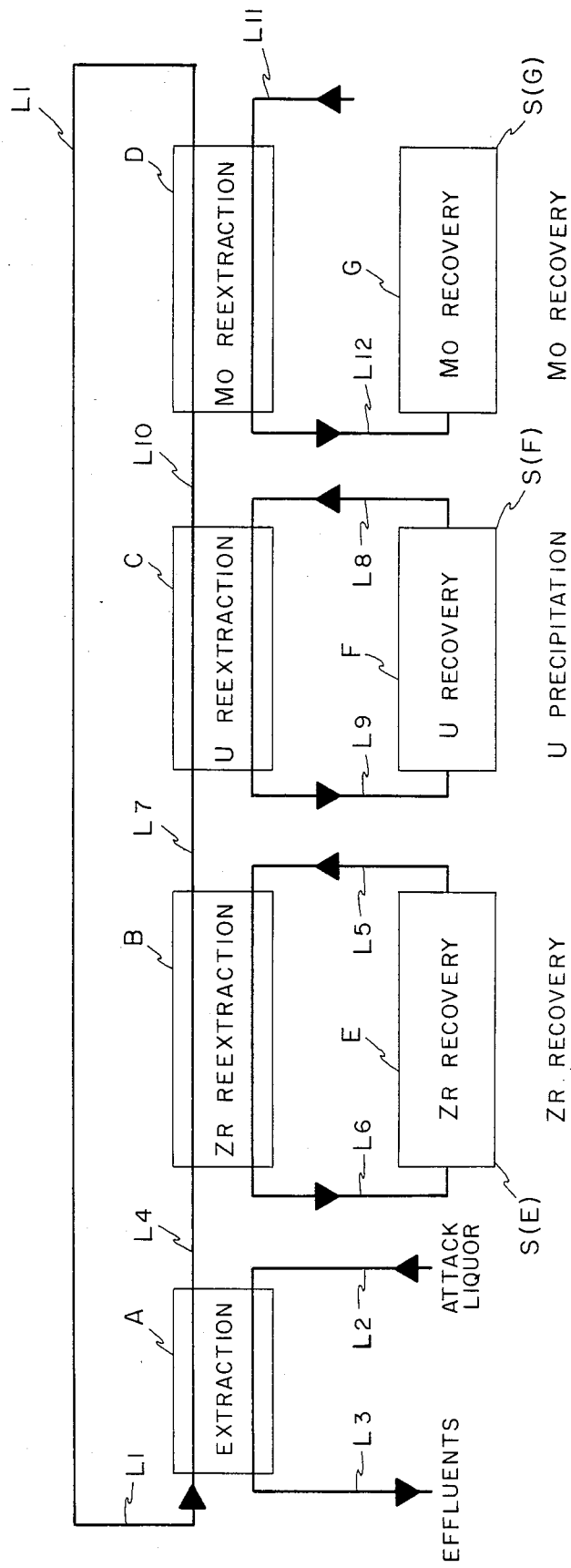

On contact with the liquor $L_2$, some of the amino organic phase $L_1$ takes up uranium and some of the amino organic phase $L_1$ takes up molybdenum and zirconium and/or hafnium, producing a charged amino organic phase $L_4$ and an aqueous acidic effluent $L_3$.

The amino organic phase $L_4$ is therefore introduced into the re-extraction zone (B). In this zone, the phase $L_4$ is contacted with the aqueous sulphuric solution $L_5$, containing at least one alkaline or equivalent sulphate according to the present invention. The aqueous solution $L_5$ is enriched with zirconium and/or hafnium producing the acidic aqueous solution $L_6$, which is introduced into the zone (E) for the recovery of the zirconium and/or hafnium by a known process, such as the process described in the French Patent Application No. 8217102 which produces a precipitate S(E) and the aqueous sulphuric re-extraction solution $L_5$ according to the present invention.

The amino organic phase $L_7$ which has been decontaminated of zirconium and/or hafnium is then introduced into the zone C for re-extracting the uranium.

In the said zone (C), the amino organic phase $L_7$ is contacted with an aqueous solution $L_8$ which contains the ions $Cl^-$ which cause the selective transfer of the uranium contained in the organic phase, thereby producing a uraniferous solution $L_9$. This uraniferous solution $L_9$ is introduced into the zone (F) for recovering the uranium, in which the solution $L_9$ is treated by a known means, such as by the introduction of an ammoniacal solution, thereby producing uraniferous precipitate S(F) of ammonium uranate and the aqueous re-extraction solution $L_8$ which is recycled.

The amino organic phase $L_{10}$ which is depleted of zirconium and/or hafnium and uranium is then introduced into the zone (D) for extracting the molybdenum. In this zone (D), the amino organic phase $L_{10}$ is treated by an aqueous solution $L_{11}$ which contains, for example, $CO_3^=$ ions as described in "The extractive of metallurgy of uranium" by Robert MERRIT, pages 196 to 201, leading to a decontaminated amino organic phase $L_1$ which is recycled in (A) and an aqueous molybdeniferous solution $L_{12}$ which is treated in (G) according to a known process, and leads to the production of a calcium molybdate concentrate S(G) or molybdenum sulphide or $MoO_3$ or others, by using one of the processes which are known by those skilled in the art.

EXAMPLE 1

This Example has the aim of illustrating the influence of the molar ratio of the alkali and equivalent sulphate and the $H^+$ concentration of the aqueous sulphuric re-extraction solution according to the present invention.

To this end, an amino organic phase is used which has the following composition in percent by volume:

| trilaurylamine | 5.3% |
|---|---|
| $C_{13}$ OXO alchol | 3.0% |
| kerosene | 91.7% |

This amino organic phase contains in milligrams per liter:

| uranium | 4500 |
|---|---|
| zirconium | 490 |

The aqueous sulphuric re-extraction solution has a pH which is held constant at 2.1 and increasing contents of ammonium sulphate.

Experiment 1 concerns the said re-extraction solution when freed of ammonium sulphate.

Experiments 2 to 5 relate to the said re-extraction solution containing increasing quantities of ammonium sulphate.

In each experiment, five parts of the abovementioned amino organic phase are brought together with one part of the aqueous sulphuric re-extraction solution in a mixer-decanter over a period of 10 minutes with stirring and at a temperature of 30° C.

At the end of this time, the phases are separated by decantation and the uranium and zirconium contents of the two phases have been analysed with a view to calculating the separation factor of these two elements.

The results are compiled in Table 1:

TABLE 1

| Experiments | Molar concentration $(NH_4)_2SO_4$ | Molar concentration of $H^+$ | $[(NH_4)_2SO_4]/H^+/$ | Separation factor "f" |
|---|---|---|---|---|
| 1: control | 0 | 0.008 | 0 | 2.5 |
| 2: present invention | 0.5 | 0.008 | 62.5 | 18.9 |
| 3: present invention | 1.5 | 0.008 | 187.5 | 25.0 |
| 4: present invention | 2.0 | 0.008 | 250 | 10.0 |
| 5: present invention | 4.0 | 0.008 | 500 | 8.5 |

This Table shows that, for a given pH, the increase in the separation factor of uranium and zirconium depends on the value of the molar ratio of the alkaline sulphate and the $H^+$ concentration and may be 10 times greater than the control sample owing to the presence of alkali or equivalent sulphate.

EXAMPLE 2

This Examples illustrates the influence of the pH on the separation factor "f" of the uranium and the zirconium and/or hafnium.

To this end, the same amino organic phase is used as in Example 1, which contains in milligrams per liter:

| uranium | 4257 |
|---|---|
| zirconium | 917 |

The aqueous sulphuric re-extraction solution contains 1.5 molar $(NH_4)_2SO_4$, but the pH thereof is variable.

Nine experiments, numbered from 6 to 14 are carried out with a pH value varying from 1.50 to 3.05.

Each experiment is carried out under the same conditions of temperature and mixing duration of the organic and aqueous phases as in Example 1.

The quantities of organic and aqueous phases which are used in each experiment are expressed by the ratio O/A of the volumes of these organic and aqueous phases.

The results which are obtained in each experiment are compiled in Table 2:

TABLE 2

| Experiments | O/A | pH | [(NH4)2SO4]/H+/ | Separation factor "f" |
|---|---|---|---|---|
| 6 | 1 | 2.02 | 157 | 51.4 |
| 7 | 5 | 2.02 | 157 | 41.7 |
| 8 | 10 | 2.05 | 168 | 42.9 |
| 9 | 1 | 2.60 | 597 | 70.6 |
| 10 | 5 | 2.25 | 267 | 54.2 |
| 11 | 1 | 3.05 | 1683 | 69.3 |
| 12 | 5 | 2.80 | 946 | 168.0 |
| 13 | 10 | 3.00 | 1500 | 87.9 |
| 14 | 5 | 1.50 | 47 | 12.1 |

The Table shows in turn, the favourable influence of the pH value on the separation factor of uranium and zirconium and/or hafnium when the pH is selected from the preferred range of from 2 to 3 according to the present invention.

EXAMPLE 3

This Example enables on the one hand the process according to the present invention to be compared with the prior art and on the other hand the synergistic influence of the presence of hydrogen peroxide on the separation factor "f" of uranium and zirconium to be shown.

To this end, the same amino organic phase is used as in Example 1, which contains in milligrams per liter:

| | |
|---|---|
| uranium | 4500 |
| zirconium | 490 |

Four experiments are carried out, for which 5 volumes of the above-mentioned organic phase are mixed with a volume of the aqueous sulphuric re-extraction solution, the composition of which is different in each experiment. The treatment temperature is 30° C. and the duration of contact of the organic and aqueous phase is 10 minutes in each experiment.

In experiment 15, the aqueous sulphuric solution does not contain alkali or equivalent sulphate according to the present invention, nor hydrogen peroxide.

In experiment 16, the aqueous sulphuric re-extraction solution does not contain alkali or equivalent sulphate but contains hydrogen peroxide. This is the illustration closest to the prior art.

In experiment 17, the aqueous sulphuric re-extraction solution contains 1.5 mols per liter of $(NH_4)_2SO_4$ according to the present invention and is free of hydrogen peroxide.

In experiment 18, the aqueous sulphuric re-extraction solution simultaneously contains 1.5 mols per liter of $(NH_4)_2SO_4$ and 1.8 mols of hydrogen peroxide per mol of zirconium which is present, according to a variant of the present invention.

All the results which are obtained in each experiment are compiled in Table 3:

TABLE 3

| Experiment | pH | [(NH4)2SO4]/H+/ | [H2O2]/Zr/ | Separation factor "f" |
|---|---|---|---|---|
| 15 Control | 2.02 | 0 | 0 | 2.5 |
| 16 Prior art | 1.90 | 0 | 120 | 30.0 |
| 17 Present invention | 2.25 | 266 | 0 | 54.2 |
| 18 Present invention | 2.17 | 223 | 1.8 | 355.0 |

Thus, this Table shows the synergistic effect of the reactive pair constituted by the presence of at least one alkali or equivalent sulphate and hydrogen peroxide, which is shown by the favourable development of the separation factor "f".

EXAMPLE 4

This Example illustrates the beneficial influence of the duration of intimate contact of the amino organic phase and the aqueous re-extraction phase according to the present invention, with regard to the separation factor "f" of the uranium and the zirconium which are contained in the organic phase.

To this end, the same organic phase is used as in Example 1, which contains in milligrams per liter:

| | |
|---|---|
| uranium: | 2185 |
| molybdenum: | 2710 |
| zirconium: | 222 |

Four experiments are carried out, in which the duration of intimate contact of the organic and aqueous phases is variable.

The treatment temperature is the same in each experiment and is maintained at 30° C.

The $Na_2SO_4$ concentration of the aqueous sulphuric re-extraction solution according to the present invention is 1.5 mols per liter.

Hydrogen peroxide is also present in each experiment in a proportion of 12 mols of $H_2O_2$ per mol of zirconium which is present.

All the results which are obtained in these experiments are compiled in Table 4.

TABLE 4

| Experiment | Duration (in min) of the intimate contact of the phases | /Na2SO4//H+/ | pH | Separation factor "f" |
|---|---|---|---|---|
| 19 | 1 | 94.6 | 1.80 | 23 |
| 20 | 2 | 106.2 | 1.85 | 58 |
| 21 | 6 | 84.4 | 1.75 | 314 |
| 22 | 10 | 119.2 | 1.90 | 400 |

Thus, it appears that the increase in the duration of intimate contact of the phases leads to an improvement in the separation factor of the uranium and zirconium.

EXAMPLE 5

This Example illustrates the favourable albeit equivalent effect of an alkali sulphate and an equivalent sulphate on the separation factor "f" of the uranium and zirconium.

To this end, the same amino organic phase is used as in Example 1, which contains in milligrams per liter:

| | |
|---|---|
| uranium: | 4500 |
| zirconium: | 489 |

Using this same organic phase, six experiments are carried out, three of which (experiments 23, 24 and 25) are carried out using the aqueous sulphuric re-extraction solution containing, according to the present invention, variable quantities of $Na_2SO_4$, whereas the three other experiments (experiments 26, 27 and 28) are carried out using the aqueous sulphuric re-extraction solution containing, according to the present invention, variable quantities of $(NH_4)_2SO_4$.

The operational conditions of temperature and duration of contact of the organic and aqueous phases are the same as in Example 1.

The results which are obtained are compiled in Table 5.

TABLE 5

| Molar concentration of alkali or equivalent $M_2SO_4$ sulphate | $/M_2SO_4/$ $/H^+/$ | pH | $/M_2SO_4/$ | | | |
|---|---|---|---|---|---|---|
| | | | $Na_2SO_4$ | | $(NH_4)_2SO_4$ | |
| | | | Experiment No. | Separation factor "f" | Experiment No. | Separation factor "f" |
| 0.5 | 63 | 2.10 | 23 | 12.0 | 26 | 18.9 |
| 1.5 | 189 | 2.10 | 24 | 19.5 | 27 | 12.0 |
| 2.0 | 252 | 2.10 | 25 | 13.2 | 28 | 8.5 |

Thus, it appears that the use of sodium sulphate or ammonium sulphate in the aqueous sulphuric re-extraction solution according to the present invention does not cause significant differences in the different separation factors which are recorded in each of the experiments.

EXAMPLE 6

(illustrated by the FIGURE)

This example illustrates the incorporation of the process according to the present invention for purifying a uraniferous amino organic solution containing uranium, molybdenum, zirconium and/or hafnium, in an industrial line for recovering uranium.

In a control sample, 10 liters per hour of an amino organic phase having the same composition as the amino organic phase described in example 1 resulting from the extraction in zone (A) of solubilised uranium in an aqueous liquor $L_2$ resulting from the sulphuric attack of a uraniferous ore are continuously treated.

The liquor $L_1$, on entering zone A, coming by recyclind from (D) contains, in milligrams per liter:

| uranium: | 1.0 |
|---|---|
| molybdenum | 5.0 |
| zirconium | 1.0 |

In zone (A), formed by four mixer-decanters operating in counter-current, the organic phase ($L_1$) is brought together with 200 liters per hour of an acidic aqueous liquor $L_2$ having the following characteristics:

| pH | 0.5 |
|---|---|
| U | 249 mg/l |
| Mo | 34 mg/l |
| Zr | 41 mg/l |

An amino organic phase $L_4$ emerges at a rate of 10 l/h from zone (A) with the following composition:

| U | 4800 mg/l |
|---|---|
| Mo | 209 mg/l |
| Zr | 222 mg/l |

While the effluent aqueous phase $L_3$ is removed, it has the following composition:

| U | 5 mg/l |
|---|---|
| Mo | 20 mg/l |
| Zr | 30 mg/l |

The organic phase $L_4$ is then introduced into zone (B) for re-extracting the zirconium and in this zone it undergoes a process according to the present invention. To this end, in zone (B) which is formed by three mixer-decanters operating in counter-current, the organic phase $L_4$ is brought together with 1 liter per hour of an aqueous suphuric re-extraction solution $L_5$ having a pH of 4.4 and containing:

| $Na_2SO_4$ | 145 g/l |
|---|---|
| U | 300 mg/l |
| Mo | 8 mg/l |
| Zr | 5 mg/l |

The pH values of the aqueous phases in the three mixers are, in the order of displacement of the amino organic phase, successively from 2.05–2.5 and 2.9.

An organic phase $L_7$ emerges from zone (B) at a rate of 10 liters per hour with the following composition:

| U | 4798 mg/l |
|---|---|
| Mo | 208 mg/l |
| Zr | 1 mg/l |

While the effluent aqueous phase $L_6$ is being guided into zone (E) with a view to recovering the zirconium by selective precipitation.

The composition of the aqueous phase $L_6$ at pH 2.05 is as follows:

| $Na_2SO_4$ | 152 g/l |
|---|---|
| U | 320 mg/l |
| Mo | 10 mg/l |
| Zr | 2220 mg/l |

In zone (C) for re-extracting the uranium, formed by the five mixer-decanters, operating in counter-current, the organic phase $L_7$ is contacted with 1.7 liters per hour of an acidic hydrochloric liquor $L_8$ having the following characteristics:

| Cl | 53,3 g/l |
|---|---|
| U | 1 mg/l |
| Mo | 1 mg/l |
| Zr | 1 mg/l |

An amino organic phase $L_{10}$ emerges from zone (C) at a rate of 10 liters per hour with the following composition:

| U | 1 mg/l |
|---|---|
| Mo | 207 mg/l |

-continued

| | |
|---|---|
| Zr | <1 mg/l |

The effluent aqueous phase $L_9$ is passed into the zone for recovering the uranium (F)— and has the following characteristics:

| | |
|---|---|
| pH | 1.5 |
| Cl | 28.4 |
| U | 33 587 mg/l |
| Mo | 1 mg/l |
| Zr | 3 mg/l |

The zirconium content of this aqueous phase $L_9$ represents 89 ppm of zirconium which is present in relation to uranium, in conformity with the ASTM C standard 967-81.

In zone (D) for re-extracting the molybdenum which is formed by three mixer-decanters, operating counter-current, the amino organic phase $L_{10}$ is contacted with 1 liter per hour of an aqueous carbonated liquor $L_{11}$, having the following composition:

| | |
|---|---|
| $Na_2CO_3$ | 106 g/l |
| U | <1 mg/l |
| Mo | <1 mg/l |
| Zr | <1 mg/l |

The regenerated amino organic phase $L_1$ on the one hand and on the other hand an aqueous carbonated phase $L_{12}$ containing:

| | |
|---|---|
| U | 10 mg/l |
| Mo | 2070 mg/l |
| Zr | 10 mg/l | emerge from zone (D) for re-extracting the molybdenum.

Thus the incorporation of the process according to the present invention for purifying a uraniferous amino organic solution containing molybdenum, zirconium, and/or hafnium as impurities into an industrial recovery cycle, enables a uraniferous concentrate to be obtained which has a greatly improved degree of purity, thereby meeting international standards.

What is claimed is:

1. In a process for the selective separation of uranium and/or molybdenum from zirconium and/or hafnium contained in a sulfuric liquor resulting from the acid attack of uraniferous ores, which comprises extracting the uranium and/or molybdenum, and zirconium and/or hafnium from the acid attack liquor by means of an amino organic solution, the improvement which comprises reextracting the zirconium and/or hafnium from the amino organic solution by contacting said amino solution with an aqueous sulfuric reextraction solution containing sulfuric acid and at least one inorganic sulfate selected from the group consisting of sodium, potassium, lithium, rubidium, cesium, thallium and ammonium sulfates to obtain a zirconium and/or hafnium charged aqueous phase and a uranium and/or molybdenum rich organic phase, and separating the zirconium and/or hafnium charged aqueous phase from the uranium and/or molybdenum rich organic phase to obtain an organic phase substantially free from zirconium and/or hafnium impurities.

2. A process for the purification by selective separation of uranium and/or molybdenum from zirconium and/or hafnium according to claim 1, wherein the aqueous sulfuric re-extraction solution contains the inorganic sulphate in a quantity such that the molar ratio of said sulphate to $H^+$ concentration is at least equal to 10.

3. A process for the purification by selective separation of uranium and/or molybdenum from zirconium and/or hafnium according to claims 1 or 2, wherein the medium obtained by contacting the amino organic solution and the aqueous sulfuric reextraction solution has a pH from 1.5 to 3.

4. A process for the purification by selective separation of uranium and/or molybdenum from zirconium and/or hafnium according to claim 1 wherein hydrogen peroxide is introduced into the aqueous sulfuric re-extraction solution.

5. A process for the purification by selective separation of uranium and/or molybdenum from zirconium and/or hafnium according to claim 4, wherein the hydrogen peroxide is added in an amount such that the molar ratio $H_2O_2/(Zr+Hf)$ is at least equal to 1.

6. A process for the purification by selective separation of uranium and/or molybdenum from zirconium and/or hafnium according to claim 1 wherein reextraction of the zirconium and/or hafnium is effected by using at least one mixer-decanter operating in co-current and/or in counter-current.

7. A process for the purification by selective separation of uranium and/or molybdenum from zirconium and/or hafnium according to claim 6, wherein reextraction of the zirconium and/or hafnium is carried out in a co-current flow in a reextraction zone having at least one mixer followed by a decanter.

8. A process for the purification by selective separation of uranium and/or molybdenum from zirconium and/or hafnium according to claim 7, wherein the zone has only one mixer and the medium obtained by contacting the amino organic solution and the aqueous reextraction solution has a pH from 1.5 to 3.

9. A process for the purification by selective separation of uranium and/or molybdenum from zirconium and/or hafnium according to claim 7, wherein the reextraction zone has several mixers in cascade and the pH value of the reextraction medium in each of the mixers is different and in the range of from 1.5 to 3.

10. A process for the purification by selective separation of uranium and/or molybdenum from zirconium and/or hafnium according to claim 6 wherein reextraction of the zirconium and/or hafnium is carried out in a zone having at least two groups of mixers and decanters mounted in series and operating in a counter-current flow.

11. A process for the purification by selective separation of uranium and/or molybdenum from zirconium and/or hafnium according to claim 10, wherein the pH of the reextraction medium in each group of mixer-decanter is in the range of from 1.5 to 3 and is different to each other group.

12. A process according to claim 2 wherein the molar ratio is from about 15 to about 5000.

13. A process according to claim 12 wherein the molar ratio is from about 100 to about 500.

14. A process according to claim 3 wherein the pH value of the medium is from 2 to 3.

15. A process according to claim 5 wherein the ratio $H_2O_2/(Zr+Hf)$ is from 1.5 to 3.

* * * * *